No. 872,478. PATENTED DEC. 3, 1907.
O. THUM.
THROTTLE CONTROLLER.
APPLICATION FILED MAY 14, 1906.

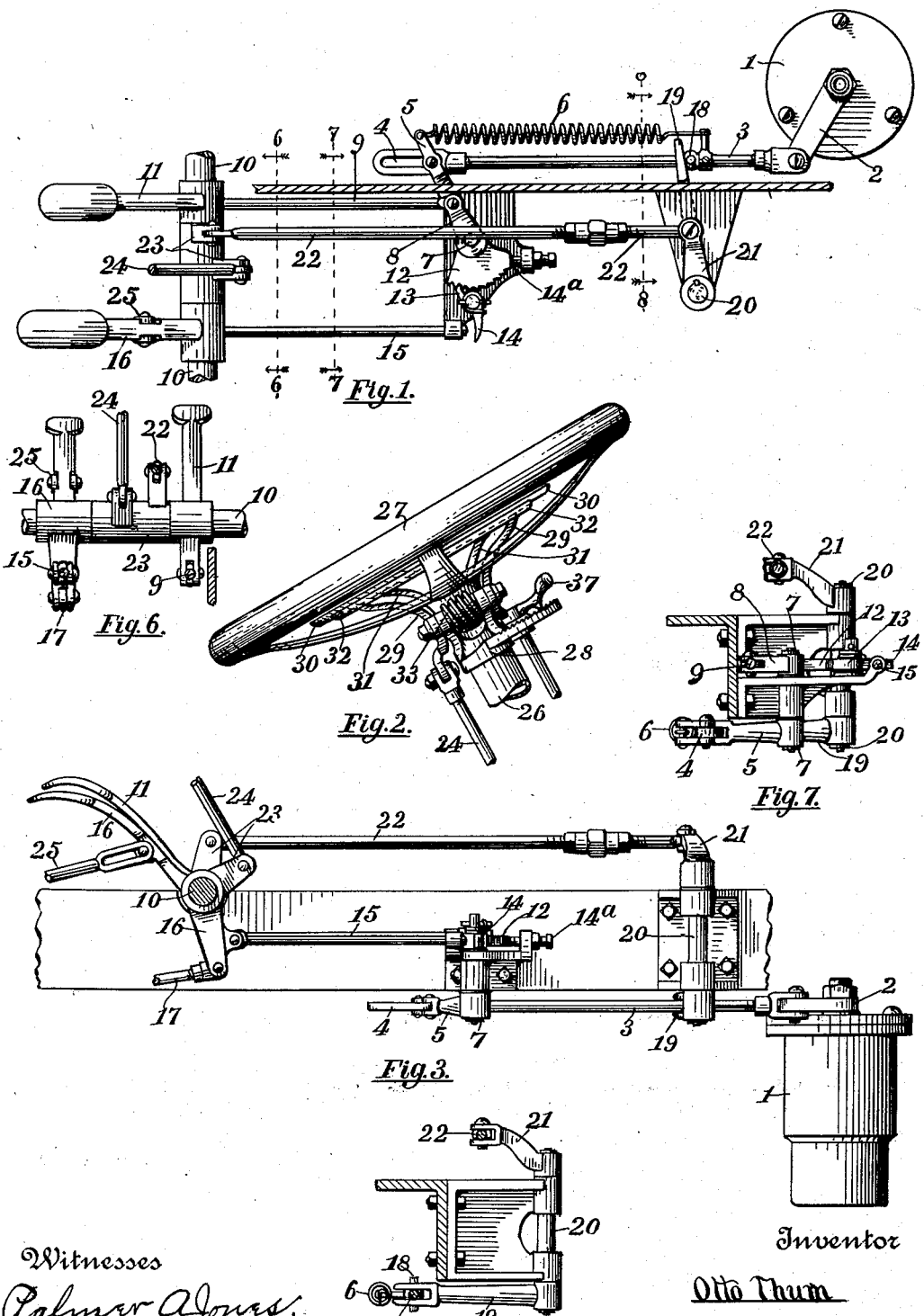

2 SHEETS—SHEET 2.

Witnesses
Palmer A. Jones
Georgiana Chace

Inventor
Otto Thum
By Luther V. Moulton
Attorney

UNITED STATES PATENT OFFICE.

OTTO THUM, OF GRAND RAPIDS, MICHIGAN.

THROTTLE-CONTROLLER.

No. 872,478.  Specification of Letters Patent.  Patented Dec. 3, 1907.

Application filed May 14, 1906. Serial No. 316,700.

*To all whom it may concern:*

Be it known that I, OTTO THUM, a citizen of the United States, residing at Grand Rapids, in the county of Kent and State of Michigan, have invented certain new and useful Improvements in Throttle-Controllers; and I do hereby declare the following to be a full, clear, and exact description of the invention, such as will enable others skilled in the art to which it appertains to make and use the same.

My invention relates to improvements in throttle controllers, and more particularly to controllers for the throttles of internal combustion engines used for propelling automobiles. Fine and accurate adjustment of such throttles, especially when they are nearly closed, is very desirable. After they are about one-third open, this is not so material. With the usual pedal operated throttle, this fine and accurate adjustment is very difficult, and often requires repeated attempts, whereby the changes are not quick or accurate enough to meet the conditions of automobile operation. It is also usual to provide means whereby when the brake is applied, the throttle automatically closes to a pre-determined minimum. In going up grade or over a heavy road, this opening should be greater than on a good or level road, otherwise the engine is likely to be stalled.

The object of my invention is to provide a device whereby the throttle may be accurately and readily controlled during the earlier stages of its opening; to provide a variable minimum opening of the throttle; to provide means for manually controlling the throttle, auxiliary to the pedal mechanism for such purpose and independently operative; and to provide the device with various new and useful features, hereinafter more fully described and particularly pointed out in the claims.

Figure 4:
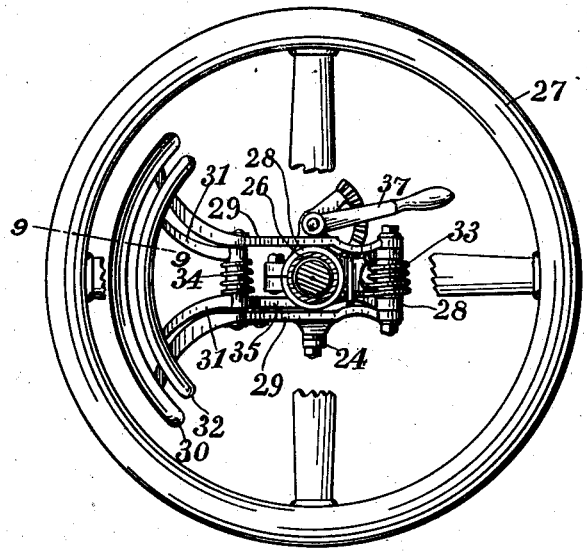
Figure 5:
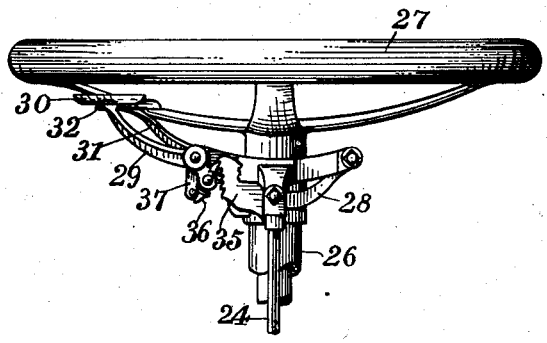
Figure 9:

My device consists essentially of, in addition to the pedal operated mechanism of an automobile as usually constructed, manually operated devices mounted near the steering wheel and adapted to accurately and minutely adjust the said throttle independent of the pedal operated mechanism and also arranged in such manner that either the pedal or the manual device may be used at pleasure, also so that the manual device will operate as an adjustable stop for the pedal mechanism, and in the various features of combination and arrangement hereinafter more fully described, reference being had to the accompanying drawings, in which:

Figure 1 is a plan view of the lower part of a device embodying my invention; Fig. 2. an elevation of the upper part of the same; Fig. 3. an elevation of the parts shown in Fig. 1.; Fig. 4. a plan view of the parts shown in Fig. 2.; Fig. 5. a rear elevation of the same; Fig. 6. a detail in section on the line 6—6 of Fig. 1., looking to the left; Fig. 7. the same on the line 7—7 of Fig. 1., looking to the right; Fig. 8. the same on the line 8—8 of Fig. 1. and Fig. 9 on enlarged transverse section of the members 30 and 32 taken on the line 9—9 of Fig. 4.

Like numbers refer to like parts in all of the figures.

1 represents any convenient throttle valve adapted to control an internal combustion engine; 2 a lever to adjust the said valve; 3 a rod attached to the lever to operate the same; 4 a link on the end of the rod; 5 a lever pivotally connected to the link and having a sliding connection therewith; 6 a contractile spring connected to the rod 3 at one end and to the lever 5 at the other end, whereby the lever is yieldingly held in connection with the forward end of the link.

7 is a rock shaft on the lower end of which the lever 5 is fixed.

8 is a lever to operate the rock shaft, which lever is connected to a pedal lever 11 mounted on a rod 10 and connected to the lever 8 by a rod 9.

12 is a rack fixed on the rock shaft 7 and held by a pawl 13, whereby the throttle valve is held more or less open after the pedal 11 has been depressed to adjust the valve.

14 is an extension of the pawl 13, which extension is engaged by a push rod 15 to release the pawl and permit the throttle valve to close whenever the brake pedal 16 is depressed. The brake pedal for this purpose is provided with a rod 17 to connect the same to the brake and also having the rod 15 attached thereto. To the brake pedal 16 is also connected the emergency brake commonly used, by means of a rod 25 having a link in the end, whereby the pedal 16 may be independently depressed, and said pedal also operated whenever the emergency brake is applied. Thus the application of either the pedal brake or the emergency brake will move the rod 15 against the projection 14 and release the pawl 13, thus permitting the throttle valve to close to the minimum opening.

14ª is an adjusting screw to limit the movement of the segment and determine this minimum opening of the throttle. Thus when the brake is applied, the throttle is automatically nearly closed and admits an amount of combustible only sufficient to keep the engine running under ordinary conditions.

So far the device described is substantially old except as to the link 4, and the sliding connection therewith of the lever 5, which is for the purpose of permitting the manually operated mechanism to be used independent of the pedal mechanism. The manually operated means for controlling the throttle is also provided with a sliding connection with the rod 3, and is preferably constructed as follows: A pin 18 is inserted in the rod 3, which pin forms a stop engaged by a forked lever 19 mounted on a rock shaft 20, and slidable on the rod 3. Said rock shaft is provided with a lever 21 fixed on the same and connected by a rod 22 to a bell crank lever 23 mounted on the rod 10 between the pedals 11 and 16.

Extending from the lever 23 upward and parallel with the steering post 26 is a rod 24, the upper end of which rod is attached to a manually operated lever 29 pivoted to a bracket 28 mounted on the upper end of the post 26. Opposite the lever 29 is another lever 29 and these two levers diverge at their movable ends and are connected by a segment 30 adapted to be manually depressed by the hand of the operator applied to the steering wheel 27. This segment is of sufficient extent concentric with the rim of the wheel 27 that it can be conveniently operated without shifting the hand upon said wheel. Whenever the lever 29 is depressed, it will by means of the described connections open the valve 1 without affecting the pedal operated mechanism, or being retarded thereby, the connection of the lever 5 sliding toward the rear of the link 4 and leaving the pedal mechanism unmoved and practically disconnected therefrom. The pin 18 will also move away from the forked end of the lever 19 when the pedal mechanism is operated, without affecting the manual device This manually operated device being intended for delicate adjustment is thus unincumbered by anything else when operated. This fork and pin connection also prevents shocks on the manual device when the pedal mechanism is released.

To hold the valve open when manually adjusted, a finely divided ratchet 35 (see Fig. 5.) is provided which ratchet is engaged by a pawl 36 on the lever 29 and thus holds the lever depressed until the pawl is released.

To release this pawl, a lever 31 is pivoted between the levers 29 and provided with a downwardly projecting arm 37, which engages and releases the pawl 36.

To depress the lever 31, a segment 32 is mounted on the same, arranged near the segment 30 and concentric therewith. To distinguish these segments 30 and 32 and prevent mistake, one segment (preferably 30) is made convex and the other segment is made concave. A spring 33 yieldingly supports the levers 29, and a spring 34 yieldingly supports the levers 31. Thus when released these levers normally rise to their elevated position.

37 represents the usual lever for adjusting the lead of the spark in the engine.

From the foregoing description of the device, and its mode of operation, it will be observed that when both the pedal and manually operated means for opening the throttle are released, the throttle will automatically assume its nearly closed position, (which is determined by adjusting the screw 14ª) to supply only sufficient fuel to keep the engine in motion. By opening the throttle by the manually operated device, it can be opened on a finer adjustment that can be conveniently done by the pedal mechanism and such adjustment can also be used as the minimum stop in place of the screw 14ª if so desired, whereby the throttle will not be closed to so great an extent as the screw is adjusted for, and will close more or less according as the manual device is adjusted. The pedal mechanism is operated to open the throttle more widely for high duty, such as bad roads, up-grades, or fast running, and the throttle is automatically dropped back to the manually adjusted opening at any time that the brake may be applied, or the manual adjustment wholly released and the throttle closed down to the screw adjustment. It will be noted that the lever 5 rigidly engages the end of the link 4 and the lever 19 likewise engages the pin 18, whereby a positive opening of the throttle by the pedal is secured and a positive stop for the throttle is provided when the pedal mechanism is released, thus insuring prompt and accurate operation. In the event of approaching a crowded thoroughfare or any place where slow movement and accurate close throttling is desirable, the manually operated mechanism becomes available at any time, and is much more convenient and reliable than the pedal operated device alone. By the described devices, I am able to use the manual control alone, or the pedal control alone, or the manual device as an adjustable and rigid minimum stop for the pedal control; or to instantly shift from one to the other and also to operate the manual device with the same hand that operates the steering wheel, thus leaving the other hand of the operator free for the emergency brake, spark adjuster or other uses.

The part of the subject matter herein shown comprising the steering post and the devices mounted thereon and connected therewith, are not herein claimed, but are reserved for a separate application in accordance with the requirement of the Office for division of this application.

What I claim is:

1. In an automobile, in combination with a throttle, a manually operated lever to partially open the throttle, means for adjusting and holding said lever, pedal operated means for wholly opening the throttle, separate means for holding the throttle in said opened position, and means for releasing the last named holding means, connected to the brake mechanism and automatically operated thereby.

2. In an automobile in combination with an engine throttle, a rod to open the throttle, two independently movable levers, each rigidly engaging the rod, in one direction only to open the valve, a spring connected to the rod and yieldingly closing the valve, means for manually adjusting one of the levers, and means for pedal adjustment of the other lever.

3. In an automobile the combination of an engine throttle, a rod to open the throttle, a spring to close the throttle, a manually adjusted lever, a pin on the rod engaged by the lever to open the valve and movable away from the lever, a second lever, means for independently adjusting said second lever, and a link on the rod having a rigid engagement with said lever, at one end and freely movable relative to said lever.

4. In an automobile, in combination with an engine throttle, a rod to open the throttle, a spring to move the rod in one direction, two separately adjustable levers, each rigidly engaging the rod in opposition to the spring, means for manually adjusting one of said levers, means for pedal adjustment of the other lever, a pawl and ratchet to hold said last named lever, and a rod connected to the brake mechanism and operated thereby to release the pawl.

5. In an automobile, the combination of an engine throttle, pedal operated means for controlling the throttle, a manually operated lever, means for connecting said lever to the throttle to partially open the same independently of the pedal operated means, a ratchet and pawl to hold said lever, and a second manually operated lever to release the pawl.

6. In an automobile, an engine throttle, pedal operated means for controlling said throttle and having a rod connected to the throttle, a stop on the rod, a pivoted lever slidable on the rod and engaging the stop to move the rod, a manually operated lever connected to the first named lever to move the same, a pawl and ratchet to hold the last named lever, and a second manually operated lever near the same to release the pawl.

7. In an automobile, an engine throttle, a rod to control the throttle, two levers to independently move the rod, and each slidably connected therewith, a pedal connected to one lever to operate the same, a pawl and ratchet to hold the lever, a brake pedal, a rod to release the ratchet and operated by the brake pedal, a manually operated lever connected to the other of the first named levers to move the same, a pawl and ratchet to hold the manually operated lever, and a second manually operated lever to release the said pawl.

In testimony whereof I affix my signature in presence of two witnesses.

OTTO THUM.

Witnesses:
PALMER A. JONES,
LUTHER V. MOULTON.